United States Patent [19]
Dudley et al.

[11] 4,116,898
[45] Sep. 26, 1978

[54] NON-THROMBOGENIC ARTICLES

[75] Inventors: Betty J. Dudley, Durham; Joel L. Williams, Cary, both of N.C.

[73] Assignee: Becton, Dickinson and Company, Rutherford, N.J.

[21] Appl. No.: 764,474

[22] Filed: Jan. 31, 1977

[51] Int. Cl.² ............................................. C08L 5/10
[52] U.S. Cl. ................................. 260/17.4 R; 3/1; 260/9; 424/83
[58] Field of Search ............... 260/9, 17.4 R; 424/78, 424/82, 83, 183; 428/447, 422, 522, 523; 3/1

[56] References Cited

U.S. PATENT DOCUMENTS

| | | | |
|---|---|---|---|
| 3,457,098 | 7/1969 | Leininger | 424/183 |
| 3,514,438 | 5/1970 | Bixler | 3/1 |
| 3,585,647 | 6/1971 | Gajewski | 428/447 |
| 3,616,935 | 11/1971 | Love | 424/183 |
| 3,617,344 | 11/1971 | Leininger | 428/422 |
| 3,634,123 | 1/1972 | Eriksson | 428/447 |
| 3,673,612 | 7/1972 | Merrill | 260/9 |
| 3,755,218 | 8/1973 | Yen | 260/9 |
| 3,766,104 | 10/1973 | Bonin | 260/9 |
| 3,844,989 | 10/1974 | Harumiya | 260/17 R |
| 3,846,353 | 11/1974 | Grotta | 260/9 |

Primary Examiner—Paul R. Michl
Attorney, Agent, or Firm—Kane, Dalsimer, Kane, Sullivan and Kurucz

[57] ABSTRACT

The disclosure is of articles having reduced thrombogenicity and which are useful for purposes requiring their contact with whole blood. The articles comprise solid, polymeric resin substrates to which there is fixed a compound of the formula:

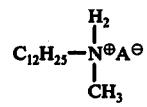

wherein A represents the residue of sodium heparin after removal of the sodium ion. The articles advantageously exhibit low toxicity and excellent blood compatibility when used for purposes which bring them into contact with whole blood for prolonged periods of time.

1 Claim, 1 Drawing Figure

NON-THROMBOGENIC ARTICLES

BACKGROUND OF THE INVENTION

1. Field of the Invention

The invention relates to non-thrombogenic articles and to methods of reducing thrombogenicity in polymer resin articles.

2. Brief Description of the Prior Art

Representative of the prior art are the disclosures of U.S. Pat. Nos. 3,617,344; 3,634,123, and 3,846,353. See also U.S. Pat. Nos. 3,755,218 and 3,766,104. As succinctly stated in U.S. Pat. No. 3,846,353, "It has been known for many years that a basic problem in the development of prostheses for intravascular replacement lies with the complicated processes occurring at the blood-graft interface. The addition of a solid foreign material to the blood stream results in clot formation on that material. This interface activity occurs no matter what the foreign material might be. Porous prosthetics have proven to be useful in the larger vessel, but have failed when adapted to the smaller artery. Certain non-porous materials have been used but also have demonstrated various disadvantages. Solid or imperforate materials are preferred in the field of artificial internal organ development. Pumping chambers, arteries, and materials for encompassing structures having moving parts would demand the property of elasticity as its constituent, prompting an additional requirement of the ideal vascular prosthetic material. It would also be advantageous if that same material could be varied in its elastic properties to the point of rigidity.

Naturally, polymers, both natural and synthetic, and particularly certain synthetic plastics have come to the fore as preferred materials for these prosthetics. Their major drawback, however, is their thrombogenicity. Even though plastics are used in various apparatus such as heart-lung machines, kidney machines, and artificial heart valves and patches, the tendency of these materials to cause coagulation necessitates the use of anticoagulants such as heparin. Even such plastics as Teflon (polytetrafluoroethylene) and the silicone rubbers which are more compatible with blood than most plastics, still show thrombogenic characteristics. The first real advance in the preparation of nonthrombogenic materials was described by Dr. Vincent Gott. The method used by Dr. Gott comprised treating a graphited surface first with Zephiran (benzalkonium chloride) and then with heparin. Materials treated in this way were nonthrombogenic in vivo for long periods of time. The major disadvantage, however, with these materials, was that the method could only be practiced on rigid plastics and a need still exists for a suitable flexible nonthrombogenic plastic, as well as a method of producing the same.

Various methods have been devised for producing such a material, most of which involve chemically bonding a quaternary ammonium salt to the polymer and then heparinizing the same. Usually, this is done by incorporating an amine in the polymer, quaternizing the amine, and then heparinizing the quaternized material. The disadvantages associated with these methods are numerous. The materials prepared by these methods have usually been satisfactory on a small laboratory scale, but could not easily be scaled up to a practical method. Furthermore, these methods were quite satisfactory for preparation and evaluation of individual polymers, the techniques varying from polymer to polymer. A major drawback, based on these differences in techniques, is that heparinization of a composite structure containing more than one type of polymer could not be easily done. Moreover, many of the techniques involve several steps requiring a variety of reagents, solvents, and reaction conditions." In addition, it has been observed that the amineheparin complex treated materials have a degree of toxicity toward the blood or the host animal in which the treated polymer is implanted. It is believed that the toxicity is generated by leaching of the amine compound from the polymer over a period of time.

By the method of our invention, relatively stable articles for use in association with whole blood are obtained, which exhibit unexpectedly low toxicity and unexpectedly reduced thrombogenecity. By the method of the invention, preformed articles, ie; valves, pins, containers, tubing and the like, may be treated to reduce thrombogenicity without increasing toxicity and without altering the geometry, configuration and/or dimensions of the article. This obviates the need for post-forming the article as often necessitated in prior art treatments by shrinking or swelling or deterioration of the treated article.

SUMMARY OF THE INVENTION

The invention comprises an article for use in association with whole blood, which comprises;
a solid, polymeric resin substrate; and
a compound of the formula:

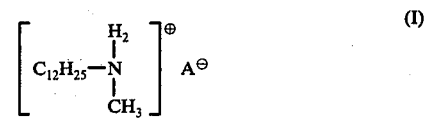

(I)

wherein A represents the residue of sodium heparin after removal of the sodium ion, affixed to said substrate.

The residue A is in fact the active heparin moiety, ie; the negative ion of sodium heparin having attached sulfate and sulfonate groups.

The invention also comprises a method for making the articles of the invention.

DETAILED DESCRIPTION OF THE INVENTION

Figure 1:
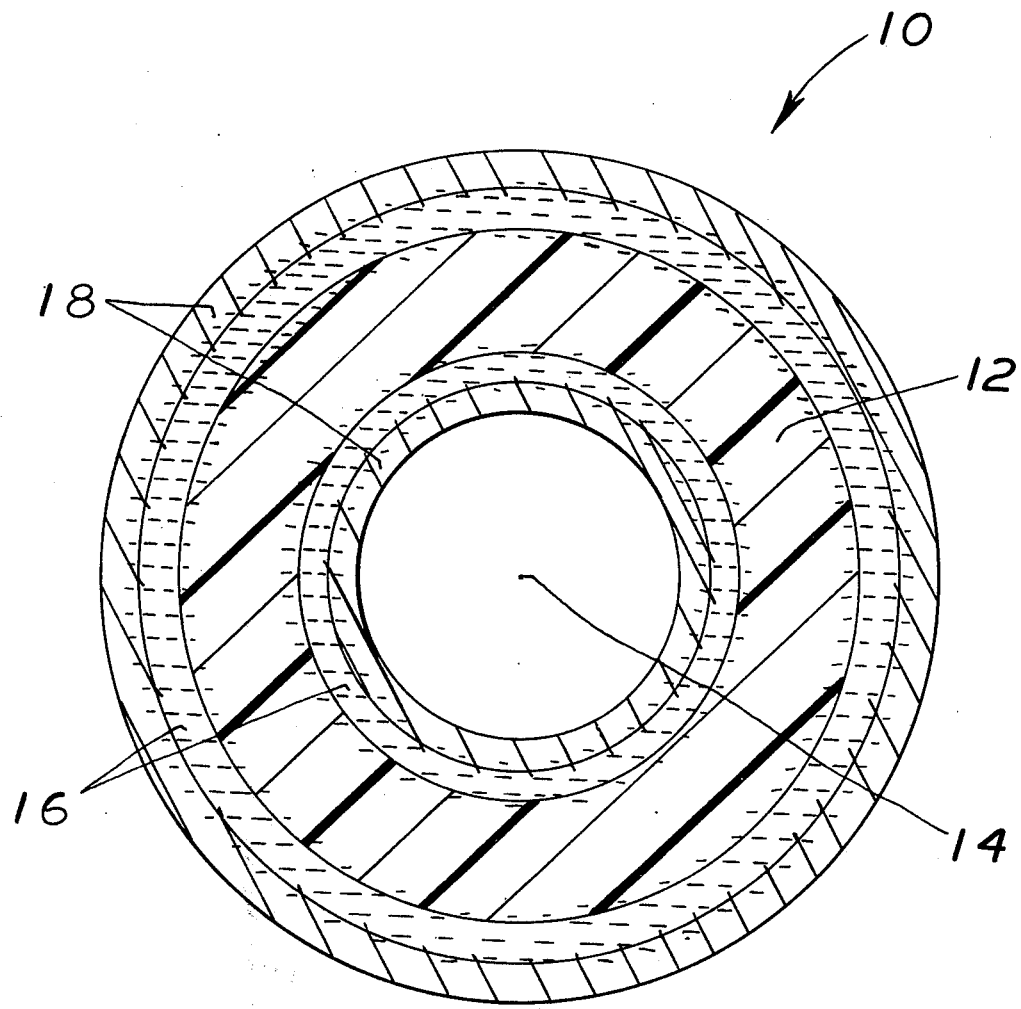
FIG. 1 is a cross-sectional view of an embodiment article (medical-surgical tube) of the invention.

The solid, polymeric resin substrate component of the articles of the invention may be fabricated from any polymeric resin, natural and synthetic, conventionally employed to fabricate articles commonly employed in contact with blood. For example, artificial blood vessels, valves and like prosthetics are frequently fabricated from polyethylene, polyacrylics polypropylene, polyvinyl chloride, polyamides, polystyrene, polytetrafluorethylene, polyesters such as polyethylene terephthalate, silicone rubber, natural rubber, polycarbonates and like polymeric resins. Such polymeric resins may be employed for the polymeric resin substrate for the articles of the present invention. The resin substrate may be rigid or flexible in character, cellular or non-cellular, porous or non-porous.

The substrate may be first formed into any desired shape, size or configuration. Representative of such are valves, pins, containers, sleeves, connectors, medical-surgical tubing, prosthetic devices and the like of any size. To the substrate there is affixed a compound of the formula (I) given above, to reduce its thrombogenicity when brought into contact with whole blood for prolonged periods of time.

The compounds of formula (I) given above are well known complexes resulting from the reaction of a dodecylmethylammonium halide and sodium heparin. The complexes may be prepared by known methods; see for example U.S. Pat. No. 3,634,123. The compounds of Formula (I) are affixed to the polymeric resin substrates by their permeating throughout the molecular structure of the resin substrate, ie; a chemisorption. It is believed that the alkyl chain portion of the compound of Formula (I) also binds itself to the resin substrate. The compounds (I) may be prepared and then chemisorbed into the resin substrate by steeping the substrate in a dispersion of the compounds (I) at elevated temperatures (at the softening point temperature for the resin substrate). By the term "softening point temperature" we mean temperature at which the surface of the resin substrate becomes pliable due to the additional mobility of the substrate molecules. Alternatively, the compounds (I) may be formed in-situ in or on the resin substrate by first affixing the dodecylmethylammonium halide to the reisin substrate as described above and then reacting the sodium heparin with the free halide ion of the affixed amine salt.

The articles of the invention may be prepared by the method of the invention which first comprises providing a polymeric resin substrate, as previously defined, in the desired article configuration and size. As an example, FIG. 1 of the accompanying drawing shows a cross-section of a medical-surgical tube 10 of the invention. The tube 10 comprises a tube substrate 12 and a lumen 14. The substrate 12 is steeped for from about 1 to 72 hours in an aqueous dispersion of dodecylmethylammonium halide such as the chloride, bromide or iodide at or just above the softening point temperature for the substrate resin. The concentration of halide in the aqueous dispersion is not critical, but advantageously is within the range of from about 0.01% to 2.0% by weight. This assures that a monolayer 16 of high concentration of the halide is provided in contact with the surface of the resin substrate. Preferably the aqueous dispersion is degassed before placing the substrate therein, by heating to a temperature of about 100° C. for 15 minutes. This degassing assures obviation of oxidation of the substrate surface during steeping. Following the period of steeping, the substrate 12 is removed from the dispersion of halide and allowed to cool to ambient temperatures. The resulting article, upon drying, bears a surface layer 16 as shown in FIG. 1, of the dodecylmethylammonium halide on inner and outer surfaces of substrate 12. The layer 16 actually penetrates to some extent the surface of substrate 12, and is chemisorbed or fixed to the substrate 12, as shown in the FIG. 1. The treated substrate may then be washed with water or an organic solvent for the halide to remove excess halide not firmly fixed to the substrate 12.

Subsequent to steeping in the halide dispersion and washing, the treated substrate 12 with its halide layer 16 is then "heparinized" by immersion in an aqueous solution of sodium heparin. The temperature at which immersion occurs is advantageously within the range of from about room temperature to about 80° C., but less than the softening point temperature for the resin substrate. The length of immersion is dependent on the temperature used, but is generally long enough to permit the substrate 12 to pick up at least about 0.1 International Unit per square centimeter of substrate surface. At a temperature of circa 70° C., for example, this is usually accomplished in about 1 hour, using a heparin solution with a concentration of from about 1% to about 15% by weight of sodium heparin. During "heparinization" the negative ion of the sodium heparin complexes with the positive ion of the dodecylmethylammonium halide according to the scheme:

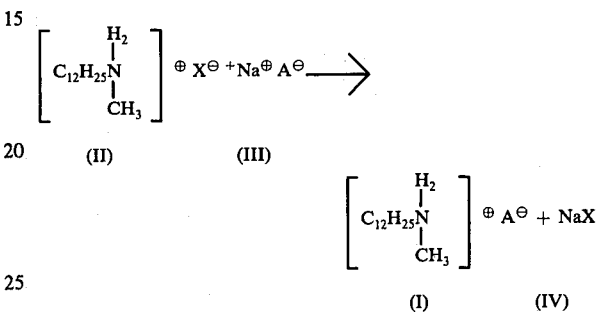

(II)    (III)

(I)    (IV)

wherein A is as previously defined and X represents halide.

The product following "heparinization" is schematically shown in FIG. 1 where the layer 18 covering inner and outer layers 16 represents the active heparin moiety which is complexed with the halide of coating layers 16 and in fact also permeates to some extent the substrate 12.

Following the heparinization step, the desired product as schematically exemplified in FIG. 1 may be removed from the heparin solution, allowed to cool, washed with water and/or saline, dryed and used in contact with blood. The article so obtained will exhibit reduced thrombogenicity and a lack of toxicity.

The following examples illustrate the method of making and using the invention and represent the best mode contemplated by the inventors of carrying out the invention but are not to be construed as limiting the invention in any way.

The blood compatibility (clotting times) reported were determined by the test method of our copending U.S. Pat. application Ser. No. 752,247, filed Dec. 30, 1976. the entire specification of which is hereby incorporated herein by reference thereto.

The toxicity test results reported were by the method described in the U.S. Pharmacopeia, Vol. XVIII at page 927. In general the method comprises extracting 10 gm samples of tubing with 20 ml. of cotton seed oil at 70° C. for 24 hours. The extract eluate is injected intraperitoneally in groups of 10 Charles River Mice at a dose of 50 mg. eluate per Kg. body weight.

EXAMPLE I

A tube fabricated from 70% by weight polyethylene and 30 % by weight bismuth oxychloride is treated by first steeping in an aqueous dispersion of 15% by weight of dodecylmethylammonium chloride for 16 hours at a temperature of 65° C. The steeped tube is then allowed to cool to room temperature, removed from the steeping dispersion and washed with water at a temperature of 25° C. The washed tube is allowed to dry and is then immersed in an aqueous solution of 90% by weight sodium heparinate for 16 hours at 65° C. The heparinized tube is washed in water at a temperature of 25° C. and then cross-linked by immersion in gluteraldehyde for 4 hours at 65° C. The crosslinked tube is then washed with a solution of Triton-100, 5% by weight in water at 25° C. and dried in a vacuum oven at 50° C. for 1 hour. The dried tube is then washed twice with 70 ml. portions of distilled water and dried again. A representative 10 gm. portion of the tube is then subjected to toxicity testing and a representative length is subjected to blood compatibility testing. The results are shown in Table I, below.

EXAMPLE 2

This example is not an example of the invention but is made for comparative purposes.

The procedure for Example 1, supra is repeated in 3 separate runs, except that the 15% dodecylmethylammonium chloride dispersion as used in Example 1 is replaced with 20%, 12% and 2% dispersions, respectively, of tridodecylmethylammonium chloride. The toxicity and blood compatibility test results are set forth in Table I, below.

EXAMPLE 3

This example is not an example of the invention but is made for comparative purposes.

Repeating the procedure of Example 1, supra, but replacing the 15% dispersion of dodecylmethylammonium chloride as used therein with a 15% dispersion of didodecylmethylammonium chloride, the toxicity and blood compatibility tests reported in Table I, below, are obtained.

TABLE I

| Example No. | Quart. Complex | Conc. | Toxicity (No. of Mice Dead) | Blood Compatibility Minutes |
|---|---|---|---|---|
| 1 | dodecylmethylammonium chloride | 15% | 0 | 186.3 |
| 2 | tridodecylmethylammonium chloride | 20% | 5 | 142.0 |
|  | " | 12% | 2 | 48.0 |
|  | " | 2% | 0 | 13.5 |
| 3 | didodecylmethylammonium chloride | 15% | 1 | 106.0 |

It will be observed from Table I, above, that, at a desirably effective blood compatibility level, only the tubing of Example 1 provides an acceptable non-toxicity.

EXAMPLE 4

The procedure of Example 1, supra, is repeated except that the polyethylene tubing as used therein is replaced with a polyurethane .020 inch ID 12 inch length tube. The toxicity and blood compatibility tests are shown in Table II, below.

EXAMPLE 5

This is not an example of the invention, but is provided for comparative purposes.

A representative portion of the polyurethane tubing treated in Example 4, supra, is tested for toxicity and blood compatibility prior to any treatment. The results are shown in Table II, below.

TABLE II

| Example | Toxicity (No. of Mice Killed) | Blood Compatibility (Minutes) |
|---|---|---|
| 4 | 0 | 250.0 |
| 5 (control) | 0 | 19.7 |

EXAMPLE 6

A stainless steel guidewire coated with a 1% solution of polyurethane in THF, is treated with dodecylmethylammonium chloride and heparin following the general procedure set forth in Example I, supra. The guidewire was then tested for blood compatibility. The test results are set forth in Table III, below.

EXAMPLE 7

As a control, the stainless steel guidewire coated with polyurethane as used in Example 6, supra., was tested before treatment with dodecylmethylammonium chloride and heparin for blood compatibility. The result is shown in Table III, below.

TABLE III

| Example No. | Quart. Complex | Conc. | Clotting Time (Minutes) |
|---|---|---|---|
| 6 | dodecylmethylammonium | 15% | 170.8 |
| 7 | (control) | — | 15.8 |

We claim:

1. An article for use in association with whole blood, which comprises;
   a solid polymeric resin substrate; and
   a compound of the formula:

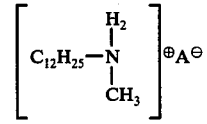

wherein A represents the residue of sodium heparin after removal of the sodium ion, affixed to said substrate said resin being polyethylene.

* * * * *